United States Patent [19]
Lowery

[11] 3,870,061
[45] Mar. 11, 1975

[54] AUTOMOBILE MOUNTED SHELTER

[76] Inventor: James I. Lowery, 208 Judy St., Houston, Miss. 38851

[22] Filed: Apr. 3, 1973

[21] Appl. No.: 347,484

[52] U.S. Cl. ............... 135/5 A, 135/1 A, 135/7.1 A
[51] Int. Cl. ............................................ E04f 10/00
[58] Field of Search ............ 135/1 R, 1 A, 5 R, 5 A, 135/7.1 R; 160/368 S

[56] References Cited
UNITED STATES PATENTS

| | | | |
|---|---|---|---|
| 2,199,915 | 5/1940 | Howard | 135/5 R |
| 2,508,757 | 5/1950 | Gray | 135/5 A |
| 2,518,167 | 8/1950 | Mintz | 135/5 R |
| 3,023,732 | 3/1962 | Everett | 135/7.1 R |

FOREIGN PATENTS OR APPLICATIONS

| 1,275,482 | 9/1960 | France | 135/5 A |
|---|---|---|---|

*Primary Examiner*—Peter M. Caun
*Attorney, Agent, or Firm*—Clarence A. O'Brien; Harvey B. Jacobson

[57] ABSTRACT

Attachable and detachable shelter means for use on and in conjunction with the engine-equipped end of a conventional-type automobile. Although the invention lends itself to family use at camp sites, picnic and beach areas, it was expressly designed to protect a user, a workng mechanic for example, from sunny, rainy and inclement environmental conditions. It is characterized, broadly construed, by a portable frame structure and canvas, plastic or equivalent weatherproof cover means spread over and protectively covering and marginally attached to oriented portions or members of the frame structure. A forward vertically disposed main supporting post has an upper end retentively connected to a forward marginal portion of the frame structure. Surface contacting means (a floor or ground) is connected to a lower end of said main post and embodies bracket means operatively connected to a predetermined portion of the car's bumper. The ready-to-use shelter also embodies, among other features, a short vertically disposed and adjustable companion or auxiliary post which is carried by a rearward portion of the frame structure and has a lower end retentively perched atop a suitable surface portion of the automobile roof.

10 Claims, 6 Drawing Figures

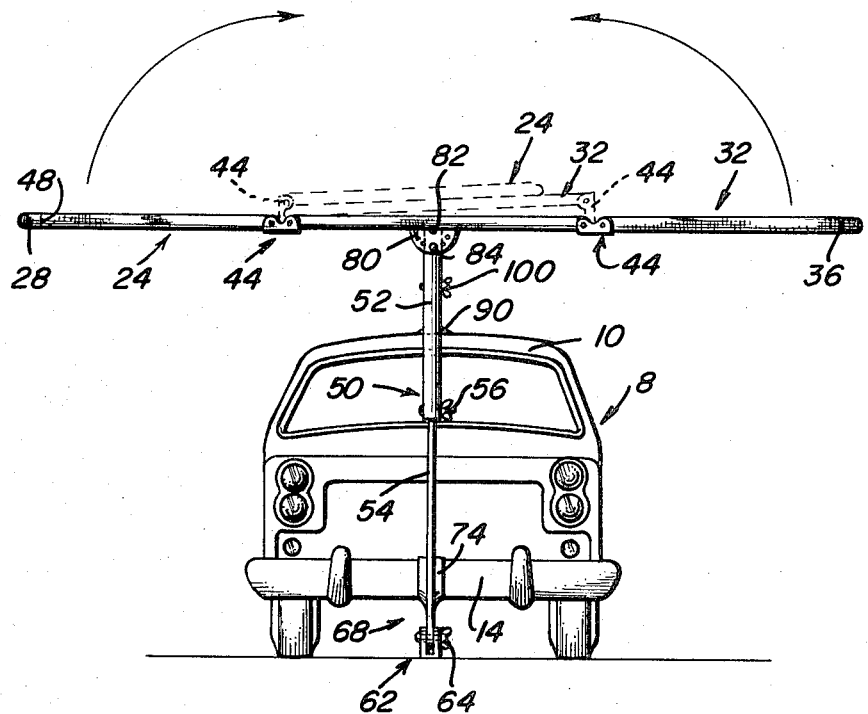
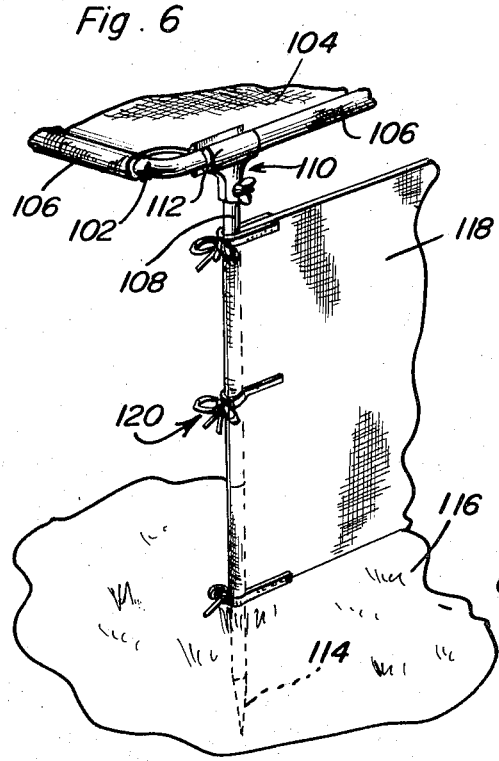
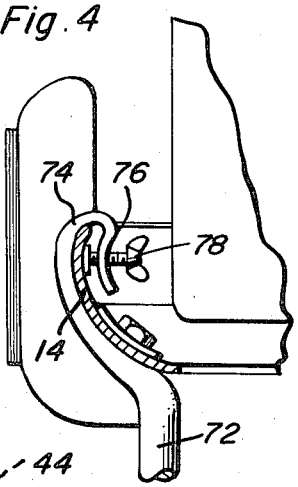
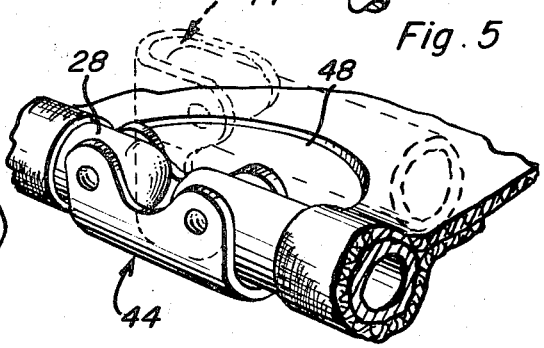

3,870,061

AUTOMOBILE MOUNTED SHELTER

The present invention relates to ceratin new and useful improvements in a novel self-contained shelter capable of protectively shielding a user, an automobile mechanic for example, from difficult-to-cope with sunny, rainy and inclement weather and environmental difficulties and pertains, more particularly to a canvas convered frame structure and supporting and elevating posts for mounting the same on conveniently available front end components of an automobile.

As implied in the preceding introductory statement of the overall invention the automobile mounted shelter means can be effectually and satisfactorily collapsed for expedient handling and transportation and used as a sun and weather shade or canopy at camping grounds and the like but was primarily devised for practical and protective use outdoors by an automobile mechanic when repairing and working on the engine-equipped front end of an automobile.

Many and various sun intercepting weather shields and caopy-type shelters have been devised for use but for one reason or another appear not to have met with widespread endorsement and unqualified use. Although many patents have been granted with a view toward coping with the ever changing weather difficulties only two references are herein being cited. As having a general bearing on the instant matter attention is invited to the dust guard for freshly painted motor vehicles revealed in a patent to Edmund A. Zielinski, U.S. Pat. No. 3,055,381 and mentioned because it shows forward and rearward uprights or posts supported from fenders and an overhead shield perched atop the respective posts. Secondly, attention is invited to U.S. Pat. No. 2,508,757 which has to do with an automobile sun protector and which was granted to Olive A. Gray. These two patents are deemed to be exemplary of the state of the art to which the present invention relates.

An object of the present invention is to advance the art of canopy-type vehicle supported shelters and, in so doing, to provide a simple, practical and acceptable construction which, it is submitted, well serves the purposes for which the invention has been devised and experimentally used.

Briefly and construed from a combination standpoint, the concept involves a construction which enables a covered frame structure to be supported centrally at the rear by a relatively short secondary or auxiliary post whose lower end is attached by a suction cup or the like to the roof of the associated automobile. The central forward portion of the covered frame structure is supported and elevated by a primary post. The associated portions of the frame members of the frame structure are pivotally mounted atop the respective posts. The mounting means is such that the covered frame structure can be positioned and held in a level horizontal position or tilted downwardly toward the left or the right, as desired, for sun intercepting and rain shedding purposes. Novel bracket means, preferably L-shaped in side elevation, is detachably connectible with a central portion of the front bumper and one leg of the bracket means rests atop the ground or other surface and is provided with an anchor for the pivoted lower end of the primary post.

As will be hereinafter more fully appreciated the respective main and auxiliary posts are proportional in length and are vertically adjustable to accommodate automobiles of varying height.

Then, too, the central or main centralized part of the covered frame structure constitutes a relatively stationary section and is of a width corresponding to the width of the underlying automobile, the lengthwise side portions having hingedly mounted frame members which define folding wings or flaps, the latter being singly or collectively foldable atop each other and atop the main section for compactness and convenience either during use or for compactness and convenience when handled or stored, as the case may be.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 3 is a front elevational view observing FIGS. 1 and 2 in a direction from left to right and showing, what is significant, how the over-hanging flap-like wings are used in full lines and how, if desired, they may be overlapped and collapsed or folded for such use as may be desired at the time.

FIG. 4 is an enlarged detail view with parts in section and elevation showing with particularity how the upper hooked end of the vertical leg of the aforementioned bracket means is detachably secured to the bumper.

FIG. 5 is an enlarged fragmentary detailed sectional view illustrating one of the aforementioned frame member hinging and linking connectors.

FIG. 6 is a fragmentary perspective view showing how, if desired, a stake (or stakes) may be utilized and clampingly connected to a corner portion of the shelter frame and for purposes of attaching and supporting a vertical side wall for more complete sheltering and privacy.

Figure 1:
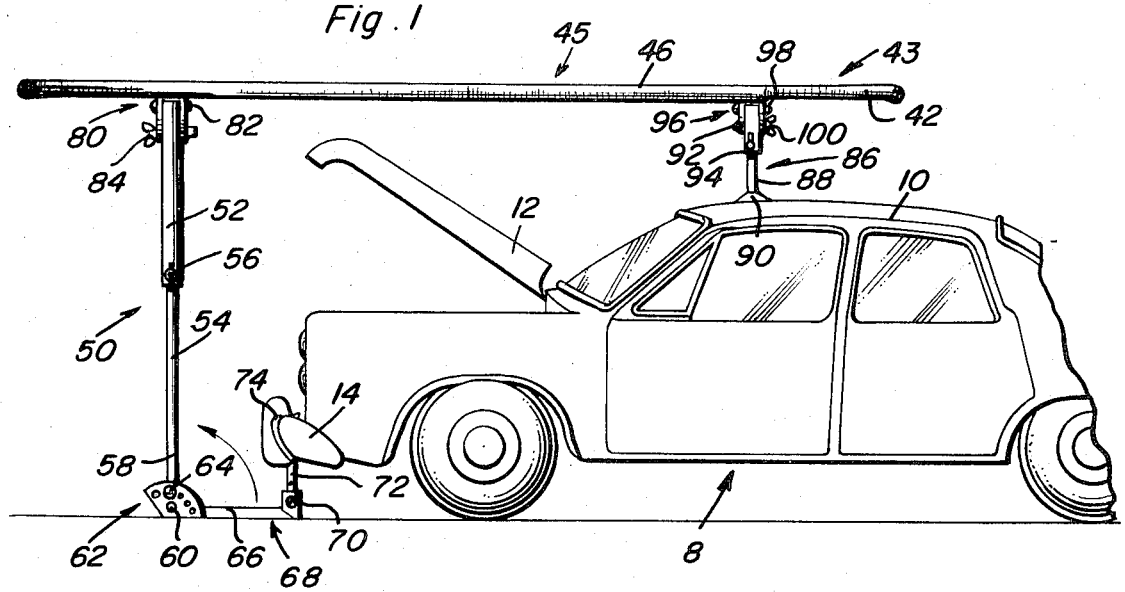
FIG. 1 is a view showing a conventional automobile in side elevation with the bonnet or hood raised and showing, more particularly, the novel automobile mounted shelter and how it is constructed, generally stated, and attached for use.
Figure 2:
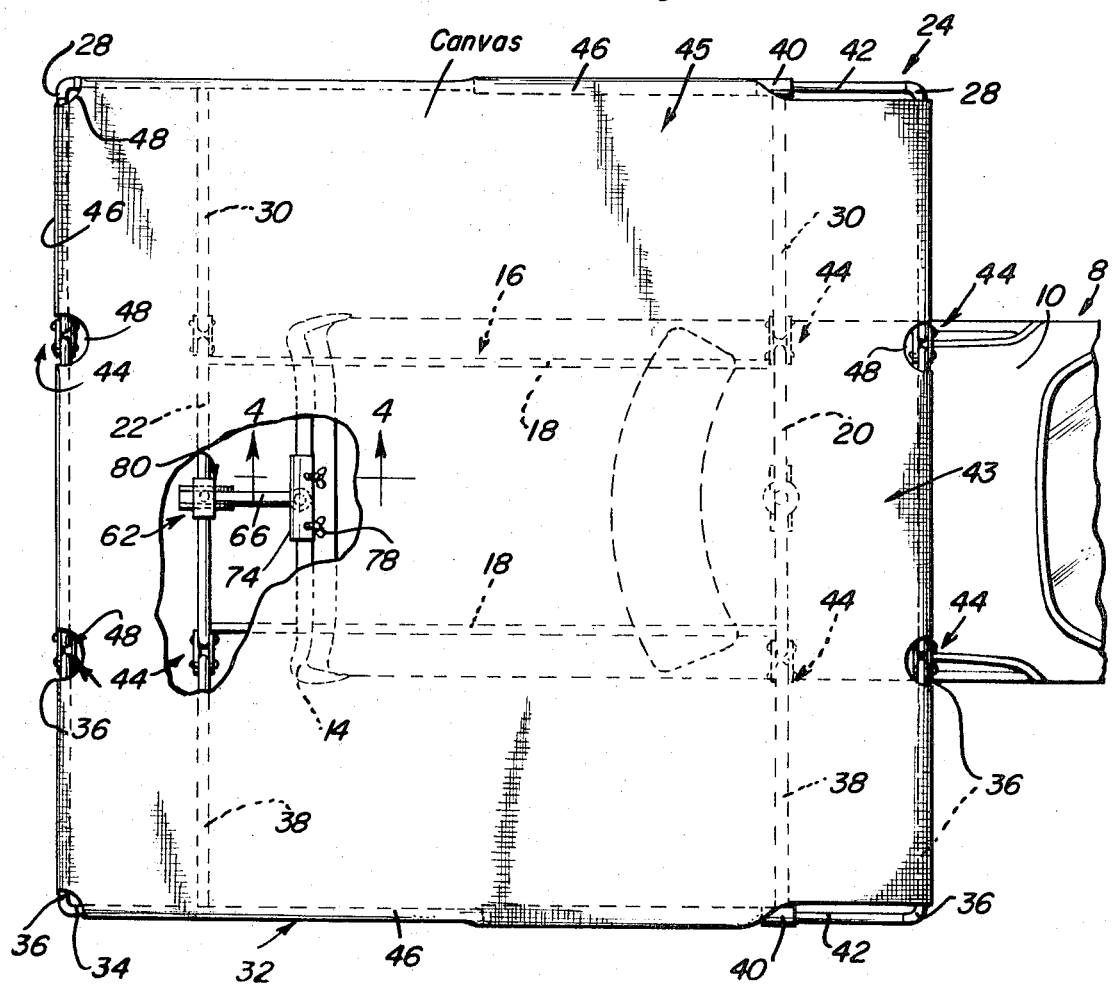
FIG. 2 is a top plan view of the structure illustrated in FIG. 1 with portions broken away to illustrate significant component parts.

With reference to FIGS. 1 to 3 the automobile is denoted by the reference numeral 8, the roof thereof at 10, the elevated bonnet or hood at 12 and the forward bumper at 14.

By way of introduction to the description of the details, it is to be reiterated that the overall concept pertains to the combination of the shelter means with the vehicle or automobile as illustrated particularly in FIGS. 1 to 3 inclusive. In addition, novelty is predicated on the subcombination aspect, that is, to the invention construed as a readily applicable and removable self-contained shelter attachment for use on and in conjunction with the associated portions of a vehcile as shown. The enclosure aspect is, as suggested, illustrated in FIG. 6.

The aforementioned frame structure is made up of a plurality of suitably interconnected tubular pipes, rods or the like of requisite weight and strength. The main component or section of the frame structure is denoted, partly in phantom lines in FIG. 2 by the numeral 16 and comprises a pair of coplanar spaced parallel pipes or tubular members 18 having rearward ends interconnected by a companion tubular member 20. A similar transverse tubular end member is shown at 22 at the left in FIG. 2 and thus these four tubular members provide the centralized nucleus or stationary section of the overall frame structure. On one side, say the left side there is a U-shaped section or frame member 24 having a bight portion 26 and leg or arm portions 28 and equipped with rigidifying braces 30. The corresponding substantially U-shaped member on the right (FIG. 3) is denoted by the numeral 32 and is structurally the same in that it embodies a bight portion 34 and leg or arm portions 36 and stabilizing braces 38. The aforementioned bight portions may be of enlarged tubular form as at 40 to accommodate the lateral telescoping end portions 42 of the extensible part 43 of the frame structure. Adjacent ends of the interconnected frame members are joined by channel-shaped connectors 44 of the type illustrated in FIG. 5. Thus, the end sections 24 and 32 of the overall frame structure are capable of being folded for compactness and convenience and to attain the extended and also folded result shown in FIG. 3. In any event, this complete frame structure is covered by a sheet of canvas 45 or other sheet plastic material having marginal hems 46 which are retained in place in a well-known manner. At marginally spaced points cutouts are provided as at 48 to provide clearance for the hinging connectors 44 and to facilitate the collapsing and folding result brought out in FIGS. 3 and 5. The main idea here is to provide a generally rectangular frame structure having a relatively stationary centered section and two left and right folding sections 24 and 32, these sections being hingedly joined for collapsing and folding and being covered by canvas or sheet plastic means to, in this manner, provide the aforementioned canopy.

The means for mounting and retaining the covered frame structure is characterized by a main vertical post 50 having an upper socket member 52 and a lower telescoping member 54. A setscrew or the like is provided as at 56 for telescopingly and adjustably connecting the post sections. A lower end portion 58 is pivotally connected as at 60 to a segmental channel-type anchor as at 62. Adjusting and fastening means is provided as at 64. The anchor is integral with a forward end portion of one horizontal leg 66 of the aforementioned L-shaped bracket 68. The rearward end is provided with a socket 70 to accommodate an end portion of the vertical leg 72. The upper portion of this vertical leg is shaped as at 74 to provide an abutment which is conformingly connected to the bumper 14, as brought out in FIG. 4. The extreme upper end portion is provided with a return bend constituting a hook 76 the bill portion of which is secured to the bumper by a setscrew or the like 78 (FIG. 4). Thus the leg 66 rests firmly but shiftably on the ground or the other surface and serves to space the main post 50 forwardly from the bumper and provides ample room so that the mechanic can work on the front end of the car without being hindered by the canopy supporting and elevating post 50. An underneath side of that portion of the canopy which is cooperable with the upper end of the post is provided with a channel-shaped adapter 80 which is disposed at right angles to the lengthwise dimension of the canopy and is pivoted in place as at 82 and provided with fastening means 84.

The companion auxiliary rearward post is denoted at 86 and comprises a bottom member 88 provided with a sucton cup 90 which is mounted atop the roof 10 as shown in FIG. 1. This section is telescopingly fitted into a socket member 92 held in place by fastening means 94 pivoted to the channel-shaped adapter 96 secured to the underneath side of the frame structure. Hereagain the pivot means is provided at 98 and fastening means is provided at 100.

The canvas covered frame structure comprising the several stationary movable sections is elevated and supported adjustably above the forward end portion and associated roof portion of the automobile. As previously stated the inverted channel-shaped brackets 80 and 90 being at right angles to the lengthwise dimension of the canopy permit the canopy to be either leveled to assume a horizontal position or tilted either to the right or left in a manner evident but not illustrated. This leveling and tilting feature permits desired sun intercepting and rain draining results to be attained.

The unique L-shaped bracket means 68 is an innovation in that the leg 68 rests firmly atop the surface (ground or floor) and reaches forwardly beyond the locale of the bumper to position the post 50 in a desired position and permits the automobile mechanic to step over the leg 66 and to gain access to the forward end of the automobile in an obvious but highly desirable manner.

It is within the purview of the invention to make the rearward section 43 of the overall canopy slidingly adjustable for required mounting purposes and it will be noted in FIG. 2 that the edge portions of the canvas cover 45 are free of direct attachment to the frame members 42 for this purpose.

It is also within the purview of the invention to utilize the slight variation or modification shown in FIG. 6 wherein it will be noted that the canopy comprises frame means 102, a canvas or equivalent flexible cover 104 secured by hems 106. The numeral 108 denotes a vertical stake having clamping means 110 at the top including jaws 112 which are connectible to the associated frame member. The lower end of the stake is pointed as at 114 to penetrate the ground 116. The purpose of the stake here is to accommodate one vertical side wall 118 which is attached in any suitable manner as at 120 to the body portion of the stake. The point here, without going into detail, is to show that it is within the purview of the invention to provide an enclosure having horizontal and vertical walls, thus providing a more complete weather shelter.

It is believed that careful consideration of the views of the drawing in conjunction with the description will enable the reader to obtain a clear and comprehensive understanding of the subject matter of the invention and features and advantages attainable. Accordingly, a more extended description is though to be unnecessary.

The foregoing is considered as illustrative only of the principles of the invention. Further, since numerous modifications and changes may readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, an automobile having a rigid roof-equipped body and a front bumper, attachable and detachable shelter means designed and adapted to shield and protect a user, a working mechanic for example, from sunny, rainy and inclement weather conditions, said means comprising a substantially horizontal roof spanning frame structure, flexible weather-proof cover means spread over, protectively covering and operatively attached to oriented portions of said frame structure, a forward vertically disposed main supporting post having an upper end retentively connected to a forward marginal portion of said frame structure, floor surface contacting means connected to the lower end of said post and embodying a rearwardly directed surface contacting bracket means provided at its rear end portion with an upwardly projecting portion operatively connected at its upper end portion to a predetermined portion of said bumper, an auxiliary vertically disposed supporting post carried by a rearward portion of said frame structure and having a lower end retentively perched atop a suitable surface portion of said roof, said bracket means being of an effective horizontal length that it functions to locate and space said main supporting post forwardly of the bumper in a manner that the mechanic at work is afforded ample space and room to work on the front engine-equipped end of the automobile for whatever purposes required.

2. The combination defined in and according to claim 1, and wherein said posts are vertically extensible and retractable for adjustment needs, and also wherein said frame structure is pivotally mounted atop the respective upper ends of said posts.

3. The combination defined in claim 1, and wherein said covered frame structure constitutes an awning-like canopy and embodies a primary central section of a width to span the underlying hood, and individual left and right flap-type foldable sections, the latter sections being joined to portions of said central section by linking hinges whereby to permit said flap-type sections to be singly or conjointly folded inwardly over said primary section and each other for compactness, convenience and particularly for handling and storage.

4. In combination, an automobile having a rigid roof-equipped body and a front bumper, attachable and detachable shelter means designed and adapted to shield and protect a user, a working mechanic for example, from sunny, rainy and inclement weather conditions, said means comprising a substantially horizontal roof spanning frame structure, flexible weather-proof cover means spread over, protectively covering and operatively attached to oriented portions of said frame structure, a forward vertically disposed main supporting post having an upper end retentively connected to a forward marginal portion of said frame structure, floor surface contacting means connected to a lower end of said post and embodying surface contacting bracket means operatively connected to a predetermined portion of said bumper, and an auxiliary vertically disposed supporting post carried by a rearward portion of said frame structure and having a lower end retentively perched atop a suitable surface portion of said roof, the centralized underneath forward and rearward portions of said frame structure being provided with coordinating, channel-type adapters pivotally and adjustably mounted on coacting upper ends of the respective posts, whereby said covered frame structure is tiltable from side-to-side and is also capable of being manually levelled and fastened in a set position.

5. For use on and in conjunction with the front end of an automobile, readily attachable and detachable self-contained shelter means comprising: L-shaped bracket means embodying a ground contacting horizontal leg having a forward end provided with a channel-shaped post anchor and at a rearward end with an upstanding vertical leg, said vertical leg having an upper bumper accommodating abutment provided with a hook designed and adapted to hitch itself over a portion of said bumper, the terminal bill portion of said hook being equipped with a bumper clamping setscrew, a main supporting post having a lower end pivotally and adjustably joined to said channeled anchor, an auxiliary roof-supported post complemental to said main post and having a lower end provided with a suction cup which can be seated and mounted on the roof of said automobile, and a horizontal sun and weather intercepting canopy having forward and rearward end portions pivotally mounted atop said main and auxiliary posts.

6. The shelter means defined in claim 5, and wherein centralized underneath surface portions of said canopy are equipped with complemental forward and rearward downwardly opening channel-shaped adapters, said adapters being pivotally and adjustably connected to coacting upper ends of the respective posts and being positioned at right angles to the lengthwise dimension of said roof and permitting the overall canopy to be horizontally leveled or, alternatively, manually tilted at will in a manner to assume and temporarily maintain a sloping rain and snow shedding position.

7. The shelter means defined in and according to claim 6, and wherein said posts embody adjustably telescopingly connected component parts.

8. The shelter means defined in claim 6, and wherein said canopy embodies a primary central section of a width to span the underlying hood, and individual left and right flap-type foldable sections, the latter sections being joined to portions of said central section by linking hinges whereby to permit said flap-type sections to be singly or conjointly folded inwardly over said primary section and each other for compactness, convenience and particularly for handling and storage.

9. In combination, an automobile having a rigid roof-equipped body and a front bumper, attachable and detachable shelter means designed and adapted to shield and protect a user, a working mechanic for example, from sunny, rainy and inclement weather conditions, said shelter means comprising a substantially horizontally disposed roof structure, a forward vertically disposed main supporting post having an upper end retentively connected to a forward marginal portion of said roof structure, floor surface contacting means connected to the lower end of said post and embodying a rearwardly directed surface contacting bracket means provided at its rear end portion with an upwardly projecting portion operatively connected at its upper end portion to a predetermined portion of said bumper, an auxiliary vertically disposed supporting post carried by a rearward portion of said roof structure and having a lower end retentively perched atop a suitable surface portion of said roof, said bracket means being of an effective horizontal length such that it functions to locate and space the main supporting post forwardly of the bumper in a manner that a mechanic at work is afforded ample space and room to work on the front engine-equipped end of the automobile for whatever purposes required, the upper ends of said main and auxiliary supporting posts being connected to the front and rear marginal portions of said roof structure generally centrally intermediate their opposite ends.

10. The combination of claim 9 wherein the central portions of the front and rear marginal edge portions of said roof structure are supported from the upper ends of said main and auxiliary posts for angular displacement of said roof structure about aligned generally horizontal axes extending between said front and rear marginal edge portions, and means connected between said front and rear marginal edge portions and the upper end portions of said main and auxiliary posts for retaining said roof structure in selected predetermined angularly displaced positions relative to said posts.

* * * * *